(12) United States Patent
Kim et al.

(10) Patent No.: US 7,084,934 B2
(45) Date of Patent: Aug. 1, 2006

(54) ARRAY SUBSTRATE FOR LIQUID CRYSTAL DISPLAY DEVICE AND MANUFACTURING METHOD THEREOF

(75) Inventors: Jin-Tae Kim, Kyongsangbuk-do (KR); Chul-Sang Shin, Choongchungnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/606,127

(22) Filed: Jun. 26, 2003

(65) Prior Publication Data

US 2004/0095519 A1 May 20, 2004

(30) Foreign Application Priority Data

Aug. 27, 2002 (KR) ............... 10-2002-0050837

(51) Int. Cl.
*G02F 1/136* (2006.01)
*H01L 29/04* (2006.01)
*G02F 1/13* (2006.01)

(52) U.S. Cl. ................. 349/43; 349/42; 257/72
(58) Field of Classification Search ........... 349/41–43; 257/59, 72
See application file for complete search history.

(56) References Cited

U.S. PATENT DOCUMENTS 6,671,010 B1 * 12/2003 Kwon et al. ............ 349/43

FOREIGN PATENT DOCUMENTS

KR 1994-0026614 12/1994
KR 2002-0016311 3/2002

* cited by examiner

*Primary Examiner*—Tarifur R. Chowdhury
(74) *Attorney, Agent, or Firm*—McKenna Long & Aldridge LLP

(57) ABSTRACT

An array substrate for a liquid crystal display device includes a thin film transistor electrically connected to a gate line and a data line, and including a gate electrode connected to the gate line, a source electrode over the gate electrode and connected to the data line, a drain electrode spaced apart from the source electrode, and a semiconductor layer having an active layer over the gate electrode and a first extended portion completely covered with the drain electrode at a boundary between the active electrode and the first extended portion.

10 Claims, 15 Drawing Sheets

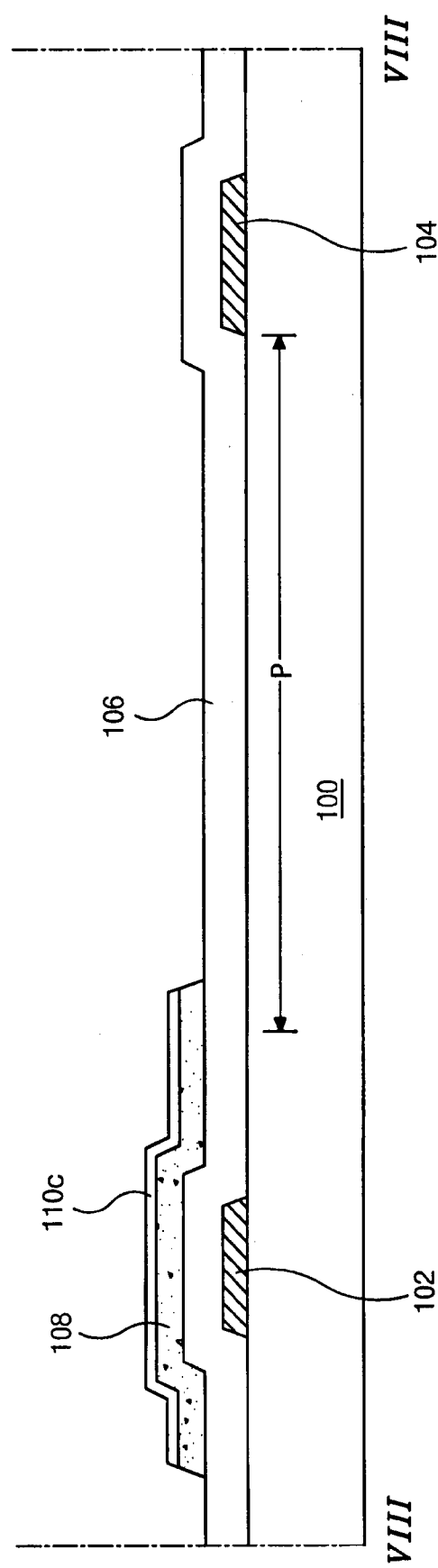

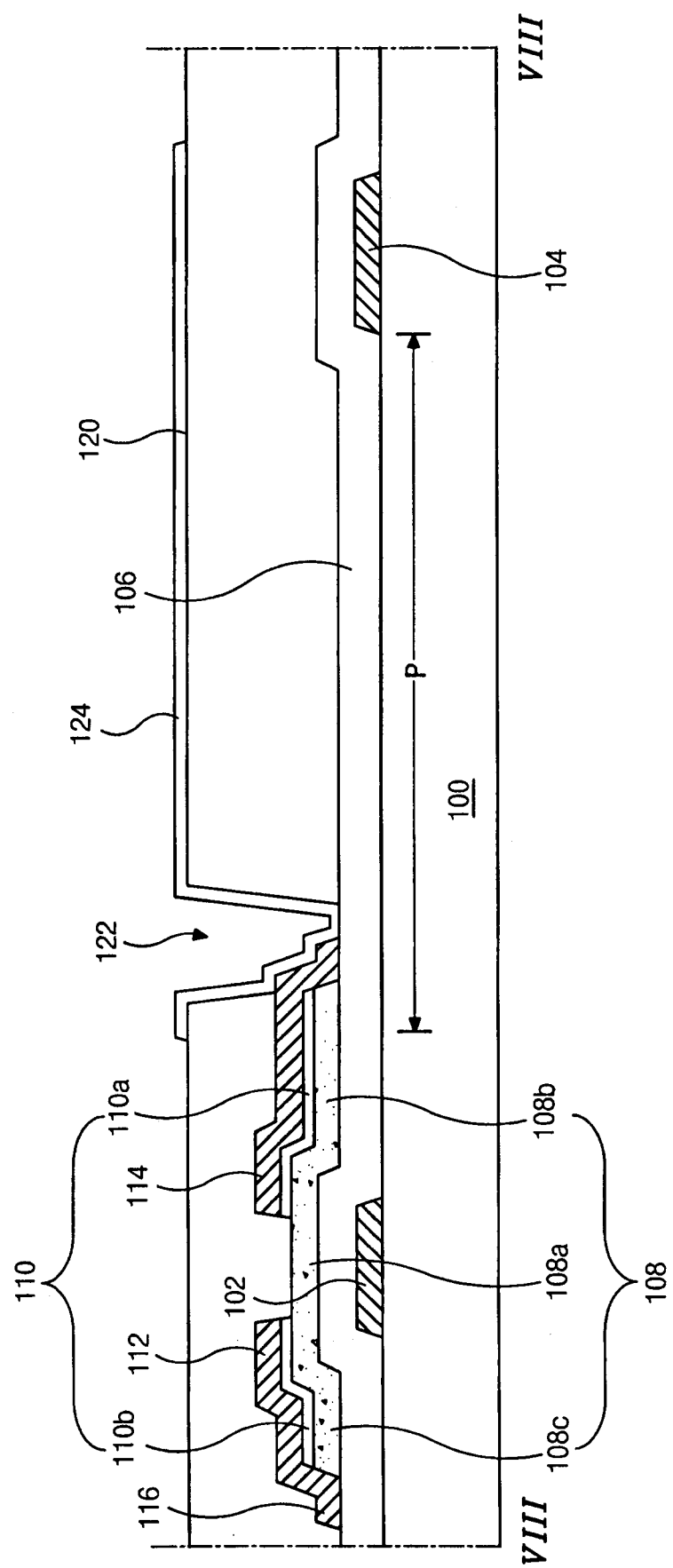

ARRAY SUBSTRATE FOR LIQUID CRYSTAL DISPLAY DEVICE AND MANUFACTURING METHOD THEREOF

This application claims the benefit of the Korean Application No. P2002-050837 filed on Aug. 27, 2002, which is hereby incorporated by reference.

BACKGROUND OF THE INVENTION

1. Field of the Invention

The present invention relates to a liquid crystal display device, and more particularly, to an array substrate for a liquid crystal display device and manufacturing method thereof. Although the present invention is suitable for a wide scope of applications, it is particularly suitable for minimizing point defect caused by a deficiency in thin film transistors.

2. Discussion of the Related Art

A liquid crystal display (LCD) device is driven by utilizing the optical anisotropy and the polarization characteristics of liquid crystal. In general, the LCD device includes two substrates that are spaced apart and face into each other, and a liquid crystal layer interposed between the two substrates. Each of the substrates includes electrodes that face into each other, wherein a voltage applied to each electrode induces an electric field perpendicular to the substrates between the electrodes. An alignment of liquid crystal molecules of the liquid crystal layer is changed by varying an intensity or direction of the applied electric field. Accordingly, the LCD device displays an image by varying light transmittance through the liquid crystal material layer in accordance with the arrangement of the liquid crystal molecules. The LCD device has characteristics of excellent light transmittance and aperture ratio.

An LCD device including thin film transistors and pixel electrodes of a matrix form, which is referred to as an active matrix LCD (AM-LCD) device, is widely used due to its high resolution and fast moving images.

FIG. 1 is an expanded perspective view of a liquid crystal display device according to the related art. In FIG. 1, an LCD device has first and second substrates 5 and 10, which are spaced apart from and facing into each other, and a liquid crystal layer 11 interposed between the first and second substrates 5 and 10.

The first substrate 5 includes a black matrix 6, a color filter layer 7, and a transparent common electrode 9 subsequently disposed on the surface of the color filter layer. The black matrix 6 has an opening such that the color filter layer 7 corresponds to the opening of the black matrix 6 and includes three sub-color filters of red (R), green (G), and blue (B).

A gate line 14 and a data line 26 are formed on the inner surface of the second substrate 10, whereby the gate line 14 and the date line 26 cross each other to define a plurality of pixel areas P, and a thin film transistor T is formed at each intersection of the gate line 14 and the data line 26. The thin film transistor T is composed of a gate electrode, a source electrode, and a drain electrode. A transparent pixel electrode 32, which is connected to the thin film transistor T, is formed within the pixel area P and corresponds to the sub-color filters. In addition, the pixel electrode 32 is formed of a light transparent conductive material, such as indium-tin-oxide (ITO). The second substrate 10 may be commonly referred to as an array substrate.

Since the operation of the thin film transistor is important to the LCD device, characteristics of the thin film transistor should be improved. For example, current that flows through the channel of the thin film transistor is proportional to a channel length over a channel width, and thus the current can be increased by shortening a channel length and widening a channel width of the thin film transistor.

FIG. 2 is a plane view of an array substrate for a liquid crystal display device according to the related art, and FIG. 3 is an enlarged plane view of region "A" of FIG. 2. In FIGS. 2 and 3, a plurality of gate lines 14 are formed to be spaced apart in a first direction on a substrate 10, and a plurality of data lines 26 are formed in a second direction to cross the gate lines 14 to define a pixel area P. A thin film transistor T is formed at the intersection of the gate and data lines 14 and 26 to function as a switching element. The thin film transistor T is composed of a plurality of gate electrodes 12 connected to the gate lines 14 and receiving scanning signals, a plurality of source electrodes 22 connected to the data lines 26 and receiving data signals, and a plurality of drain electrodes 24 spaced apart from the source electrodes 22. The thin film transistor T further includes a semiconductor layer 18 between the gate electrode 12 and the source and drain electrodes 22 and 24.

A transparent pixel electrode 32 is formed in the pixel area P and is connected to the drain electrode 24. The pixel electrode 32 overlaps the gate line 14 to form a storage capacitor.

Here, the source and drain electrodes 22 and 24 are spaced apart over the gate electrode 12. The source electrode 22 extended from the data line 26 has a U-shape, and encloses a part of the drain electrode 24. The drain electrode 24 may have a first part that is surrounded by the source electrode 22 and a second part that is located at the pixel electrode 32. The first part has a rod shape, and the second part is larger than the first part.

Therefore, a channel CH between the source and drain electrodes 22 and 24 has a U-shape, and a current flowing through the channel is increased because a length L of the channel gets shorter and a width W of the channel grows wider.

Meanwhile, the semiconductor layer 18 consists of an active layer 18a over the gate electrode 12, a first extended portion 18b under the drain electrode 24, and a second extended portion 18c under the data line 26.

The first extended portion 18b of the semiconductor layer 18 rapidly becomes narrow toward the second part of the drain electrode 24 passing by one side of the gate electrode 12. Therefore, the first extended portion 18b of the semiconductor layer 18 is exposed in the region B that is outside the gate electrode 12. The drain electrode 24 may be disconnected by an etchant for patterning the source and drain electrodes 22 and 24 due to the exposed portion of the semiconductor layer 18.

FIGS. 4A to 4C and FIGS. 5A to 5C show the sequential process steps for methods of fabricating an array substrate according to the related art. FIGS. 4A to 4C are cross-sectional views taken along line IV—IV of FIG. 2, and FIGS. 5A to 5C are cross-sectional views taken along line V—V of FIG. 3.

In FIGS. 4A and 5A, a gate electrode 12 and a gate line 14 connected to the gate electrode 12 are formed on a substrate 10 by depositing and patterning a first metal layer. The gate line 14 and the gate electrode 12 are made of a metal material, such as aluminum (Al), an aluminum alloy of aluminum and neodymium (Nd), molybdenum (Mo), tungsten (W), and chromium (Cr). The gate line 14 and the gate electrode 12 may be formed of a double layer using aluminum or an aluminum alloy and molybdenum or chromium.

Aluminum having a relatively low electrical resistivity is widely used as a material of the gate line 14 and the gate electrode 12 to minimize RC delay. However, since aluminum may be easily corroded by acid during a fabrication process and may cause hillock in a later process under a high temperature condition, the gate line 14 may be disconnected. Thus, the gate line 14 and the gate electrode 12 may be formed of an alloy or a double layer including aluminum.

A gate insulating layer 16 is formed on the substrate 10 having the gate line 14 and the gate electrode 12 formed thereon by depositing an inorganic insulating material, such as silicon nitride (SiNx) and silicon oxide ($SiO_2$), or by coating an organic insulating material, such as benzocyclobutene (BCB) and acrylic resin.

Subsequently, a semiconductor layer 18 and a doped semiconductor layer 20c are formed on the gate insulating layer 16 over the gate electrode 12. The semiconductor layer 18 is made of amorphous silicon and the doped semiconductor layer 20c is made of doped amorphous silicon.

As shown in FIGS. 4B and 5B, a data line 26, a source electrode 22, and a drain electrode 24 are formed by depositing and patterning a second metal layer. The data line 26, the source electrode 22, and the drain electrode 24 may be made of the metal material described above. Next, the doped semiconductor layer 20c of FIG. 4A, exposed between the source and drain electrodes 22 and 24, is removed to form an ohmic contact layer 20. As described above, the semiconductor layer 18 is composed of an active layer 18a over the gate electrode 12, a first extended portion 18b under the drain electrode 24, and a second extended portion 18c under the data line 26. The ohmic contact layer 20 consists of a first portion 20a corresponding to the drain electrode 24 and a second portion 20b corresponding to the data line 26 and the source electrode 22.

Although it is not shown in the drawings, the source electrode 22 has a U-shape, and the drain electrode 24 has a first part of a rod shape and a second part larger than the first part. The source electrode 22 surrounds the first part of the drain electrode 24. The first extended portion 18b of the semiconductor layer 18 gets rapidly narrow toward the second part of the drain electrode 24 passing one side of the gate electrode 12, and the first extended portion 18b of the semiconductor layer 18 is exposed at both sides of the drain electrode 24 in the rapidly narrowing region B. In region B where the first extended portion 18b is exposed, there is a metal pattern. More specifically, the drain electrode 24 is disposed over the semiconductor layer 18 in region B. An etchant may remain in region B after patterning the source and drain electrodes 22 and 24, and thus the drain electrode 24 may be disconnected due to the remaining etchant.

Meanwhile, in a region where the data line 26 is located, the second extended portion 18c of the semiconductor layer 18 forms a step and prevents the etchant from flowing under the data line 26. Therefore, the data line 26 is hardly affected by the etchant and is not disconnected.

Next, as shown in FIGS. 4C and 5C, a passivation layer 28 is formed on the substrate 10 including the source and drain electrodes 22 and 24 by coating a transparent organic material, such as benzocyclobutene (BCB) and an acrylic resin, or by depositing an inorganic material, such as silicon nitride (SiNx) and silicon oxide ($SiO_2$). The passivation layer 28 is patterned, and a drain contact hole 30 exposing the drain electrode 24 is formed. A pixel electrode 32 is formed in a pixel area P on the passivation layer 28 by depositing a transparent conductive material, such as indium-tin-oxide (ITO) and indium-zinc-oxide (IZO), and by patterning the transparent conductive material. The pixel electrode 32 is connected to the drain electrode 24 through the drain contact hole 30.

However, in the LCD device including the above-described array substrate, the drain electrode may be disconnected due to the etchant in the region where the semiconductor layer is exposed.

SUMMARY OF THE INVENTION

Accordingly, the present invention is directed to an array substrate for a liquid crystal display device and manufacturing method thereof that substantially obviates one or more of problems due to limitations and disadvantages of the related art.

Another object of the present invention is to provide an array substrate for a liquid crystal display device and manufacturing method thereof that prevents signal disconnection.

A further object of the present invention is to provide an array substrate for a liquid crystal display device and manufacturing method thereof that improves productivity of the device.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having an array substrate includes a substrate, a gate line and a data line on the substrate, the gate line and the data line crossing each other and defining a pixel area, a thin film transistor electrically connected to the gate line and the data line, and including a gate electrode connected to the gate line, a source electrode over the gate electrode and connected to the data line, a drain electrode spaced apart from the source electrode, and a semiconductor layer having an active layer over the gate electrode and a first extended portion completely covered with the drain electrode at a boundary between the active electrode and the first extended portion, wherein the first extended portion is disposed over the gate electrode, and a pixel electrode in the pixel region and connected to the drain electrode.

In another aspect of the present invention, a method of fabricating a liquid crystal display device having an array substrate includes forming a gate line on a substrate, forming a data line crossing the gate line and defining a pixel area, forming a thin film transistor connected to the gate line and the data line, the thin film transistor having a gate electrode connected to the gate line, a source electrode over the gate electrode and connected to the data line, a drain electrode spaced apart from the source electrode, and a semiconductor layer having an active layer over the gate electrode and a first extended portion completely covered with the drain electrode at a boundary between the active layer and the first extended portion, wherein the first extended portion is disposed over the gate electrode, and forming a pixel electrode in the pixel area, the pixel electrode electrically connected to the drain electrode.

In a further aspect of the present invention, a method of fabricating a liquid crystal display device having an array substrate includes forming a gate line and a gate electrode on a substrate, forming a gate insulating layer on the gate line and the gate electrode, forming a semiconductor layer on the gate insulating layer, the semiconductor layer having an active layer over the gate electrode and a first extended portion, wherein the first extended portion at a boundary with the active layer is disposed over the gate electrode, forming a data line, a source electrode, and a drain electrode on the semiconductor layer, the data line crossing the gate line and defining a pixel area, the source electrode disposed over the gate electrode and connected to the data line, the drain electrode spaced apart from the source electrode and completely covering the first extended portion of the semiconductor layer at a boundary between the first extended portion and the active layer, forming a passivation layer on the data line, the source electrode, and the drain electrode, and forming a pixel electrode in the pixel area on the passivation layer, the pixel electrode connected to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIGS. 8A to 8C show the sequential process steps for a method fabricating of an array substrate for a liquid crystal display device according to the present invention and are cross-sectional views taken along line VIII—VIII of FIG. 6.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
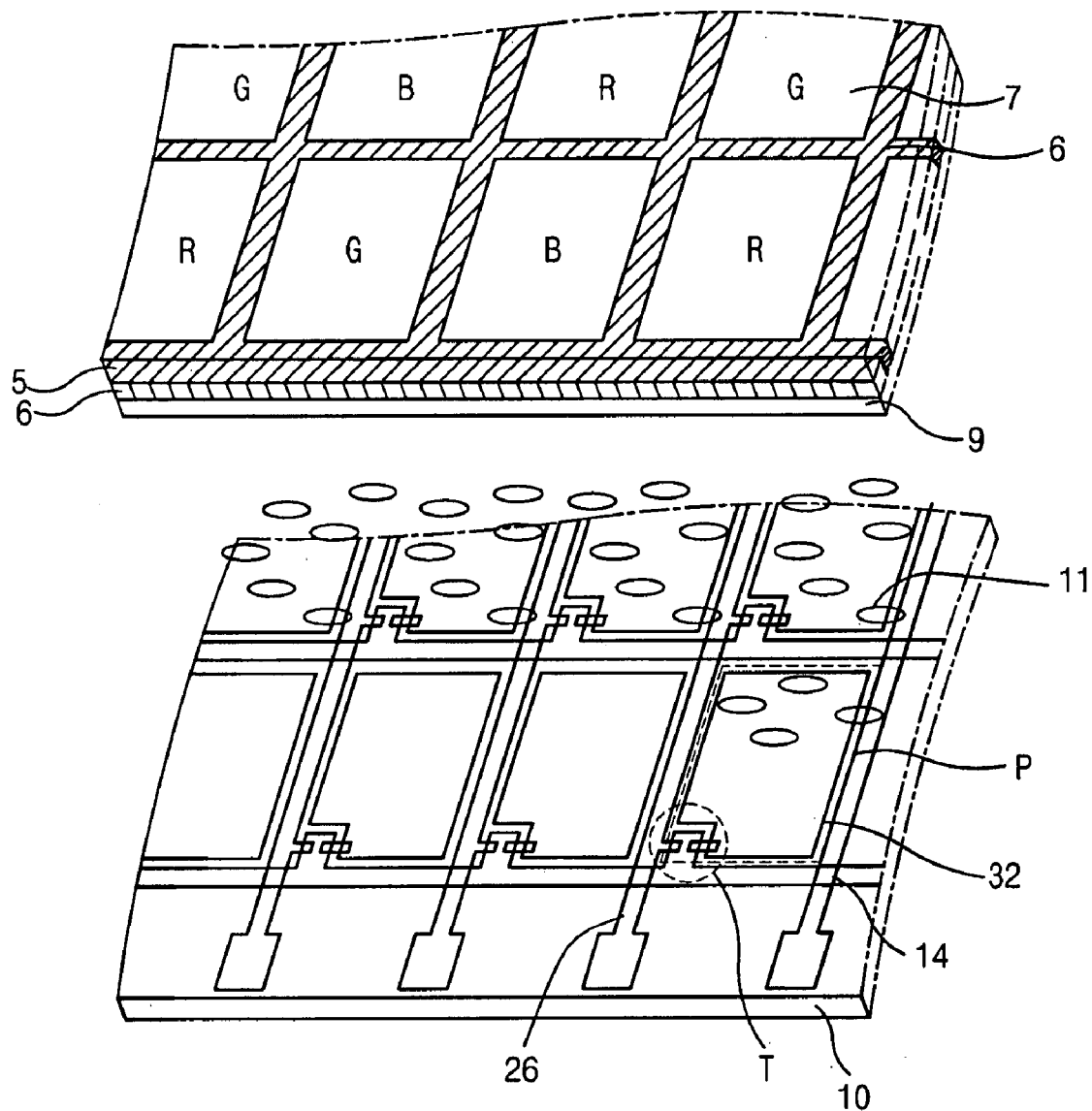
FIG. 1 is an expanded perspective view of a liquid crystal display device according to the related art.
Figure 2:
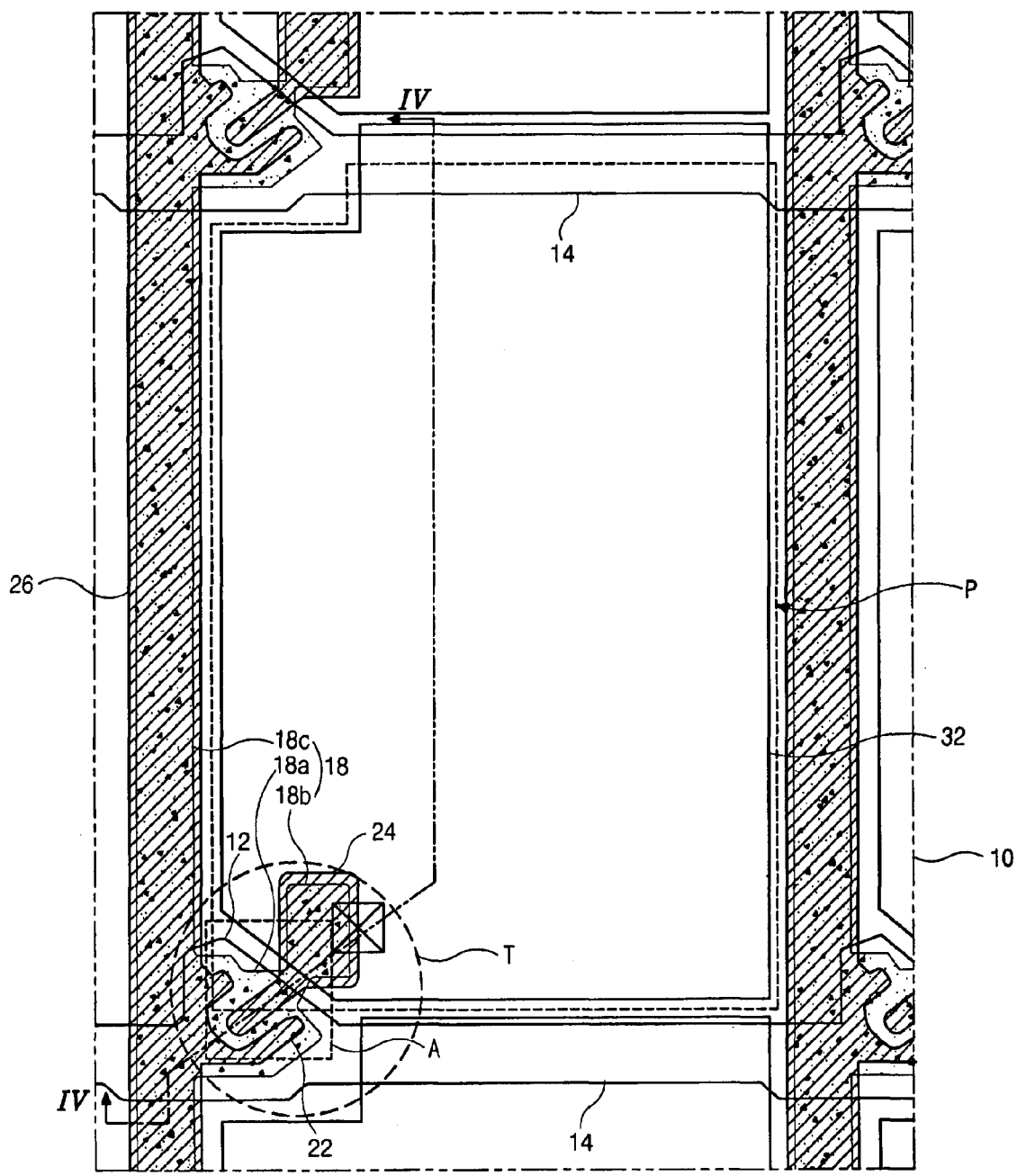
FIG. 2 is a plane view of an array substrate for a liquid crystal display device according to the related art.
Figure 3:
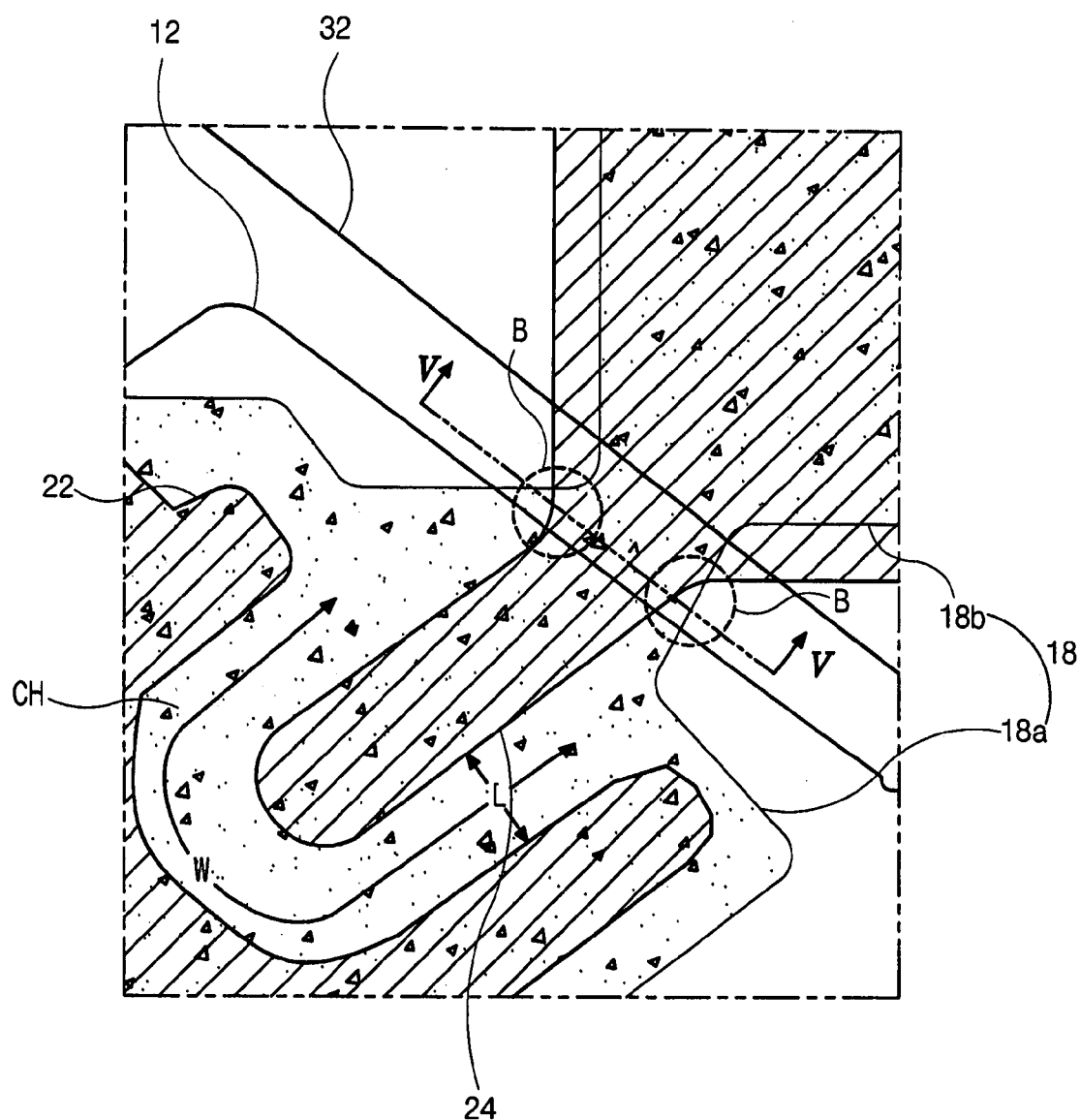
FIG. 3 is an enlarged plane view of region "A" of FIG. 2.
Figure 4A:
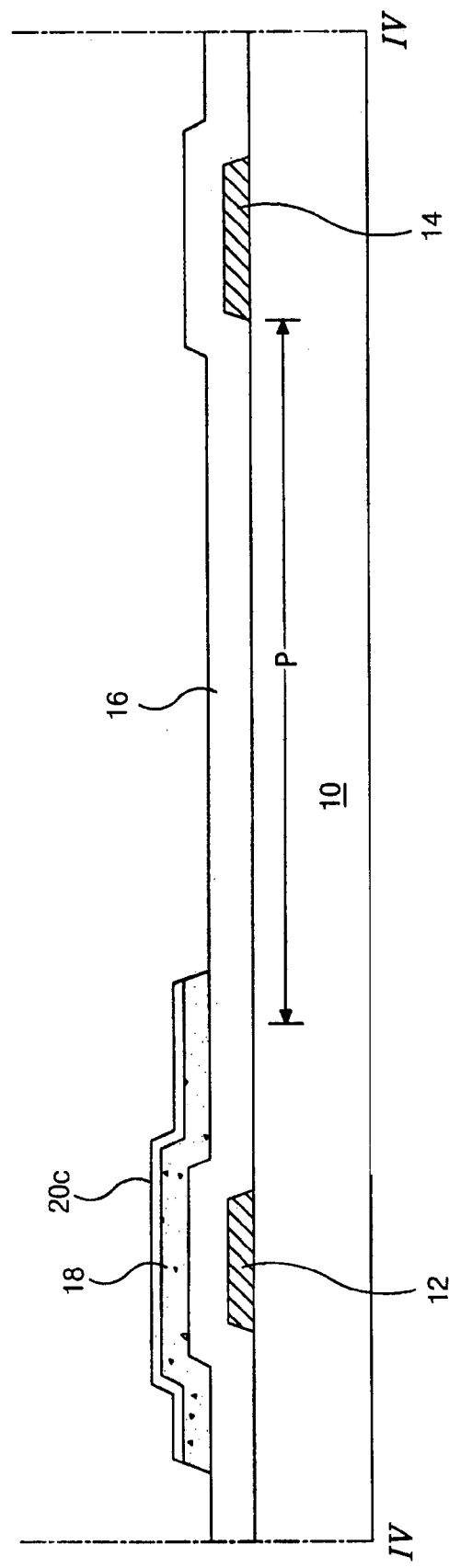
FIGS. 4A to 4C show the sequential process steps for a method of fabricating an array substrate according to the related art and are cross-sectional views taken along line IV—IV of FIG. 2.
Figure 4B:
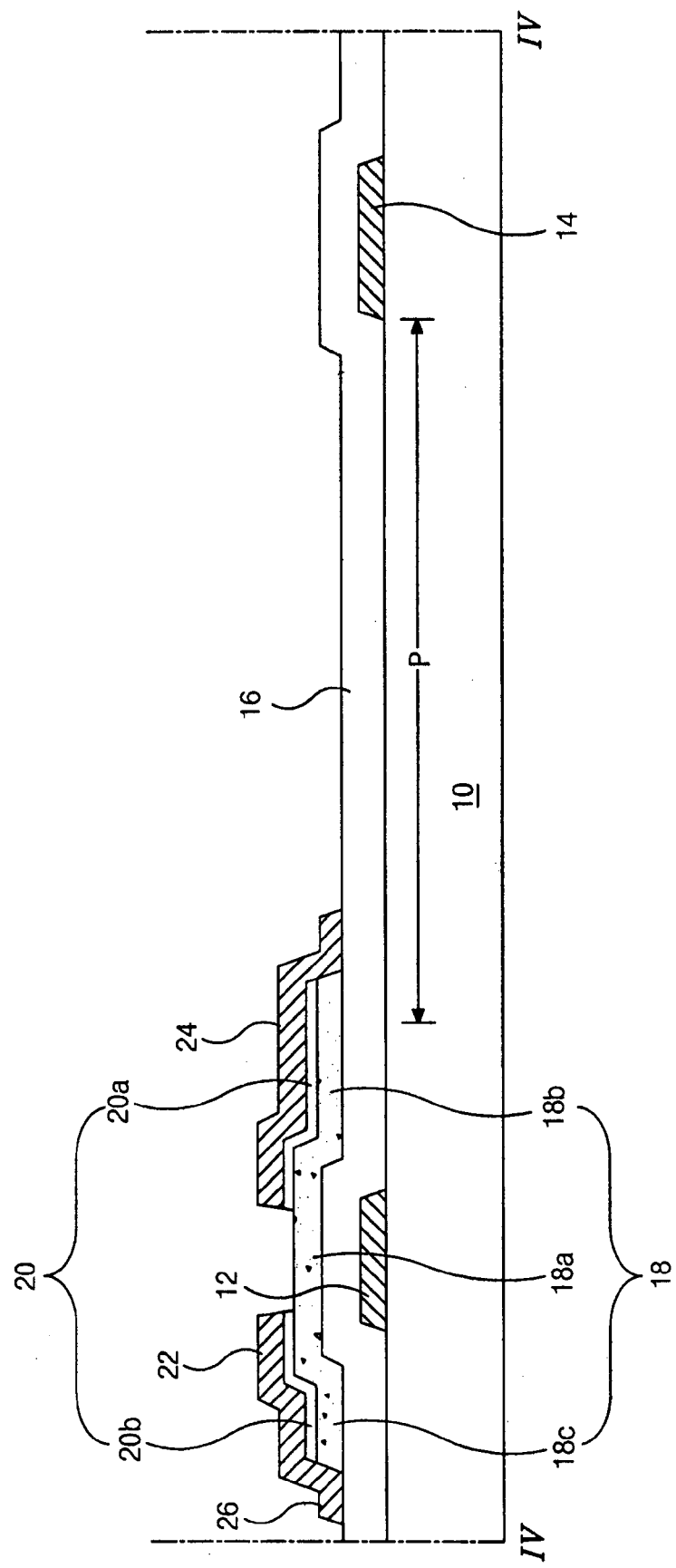
Figure 4C:
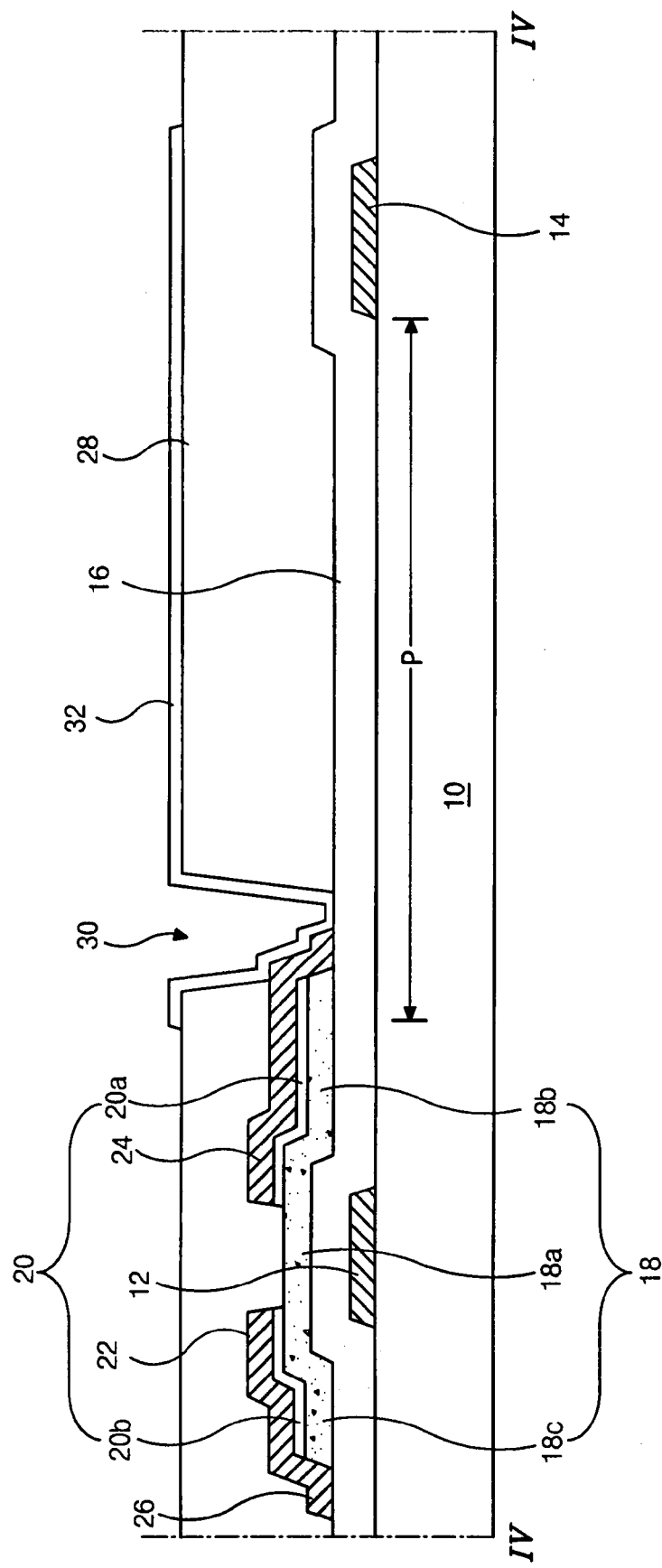
Figure 5A:
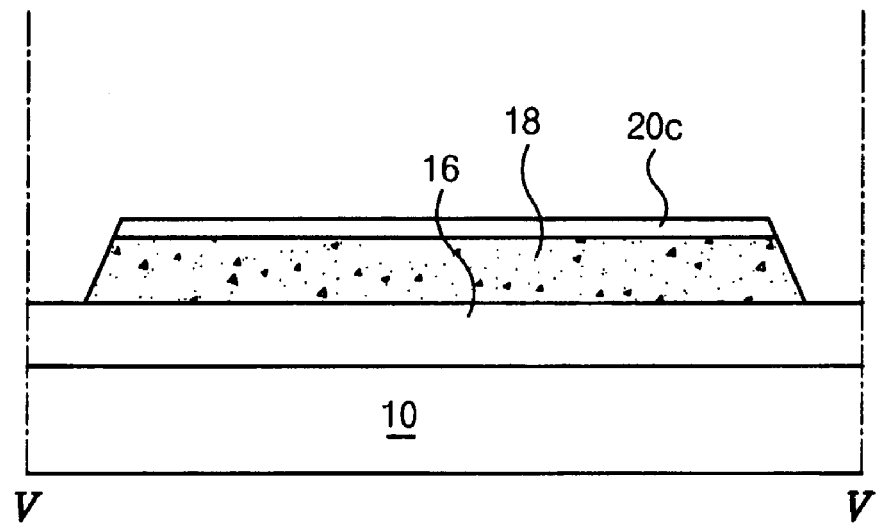
FIGS. 5A to 5C show the sequential process steps for a method of fabricating an array substrate according to the related art and are cross-sectional views taken along line V—V of FIG. 3.
Figure 5B:
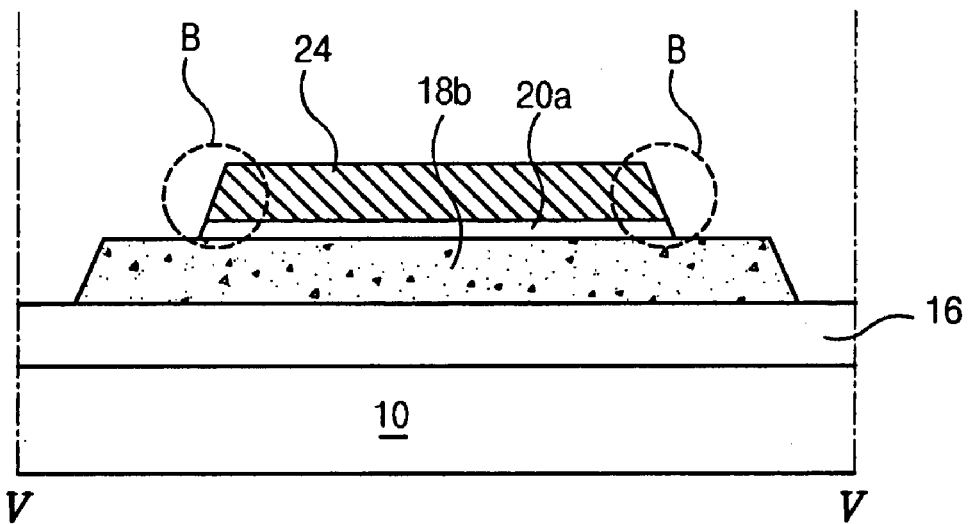
Figure 5C:
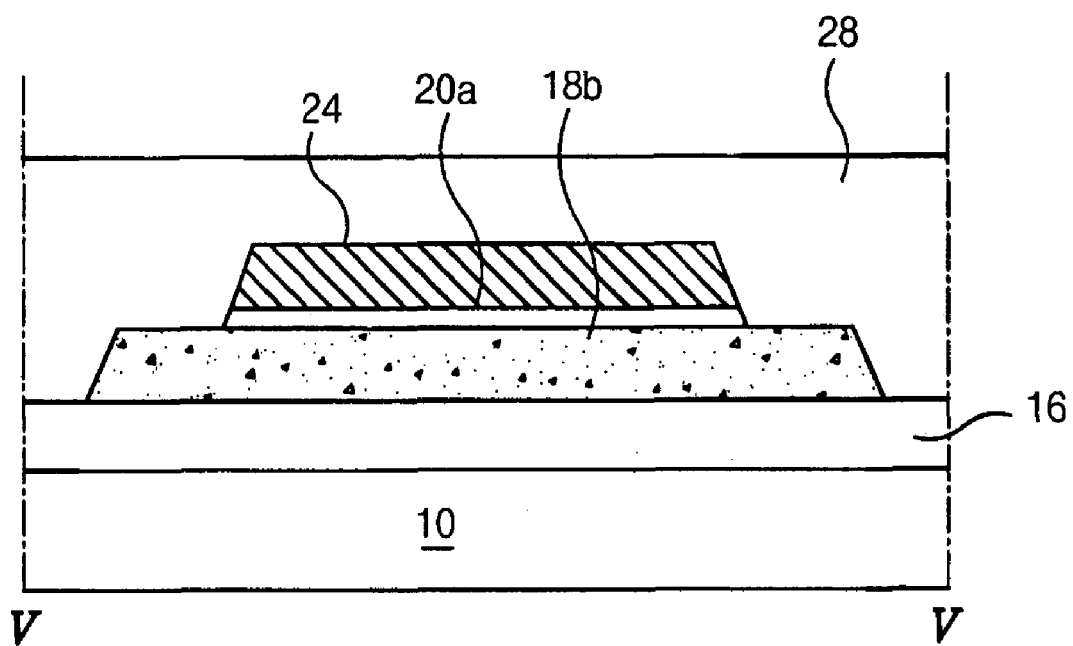
Figure 6:
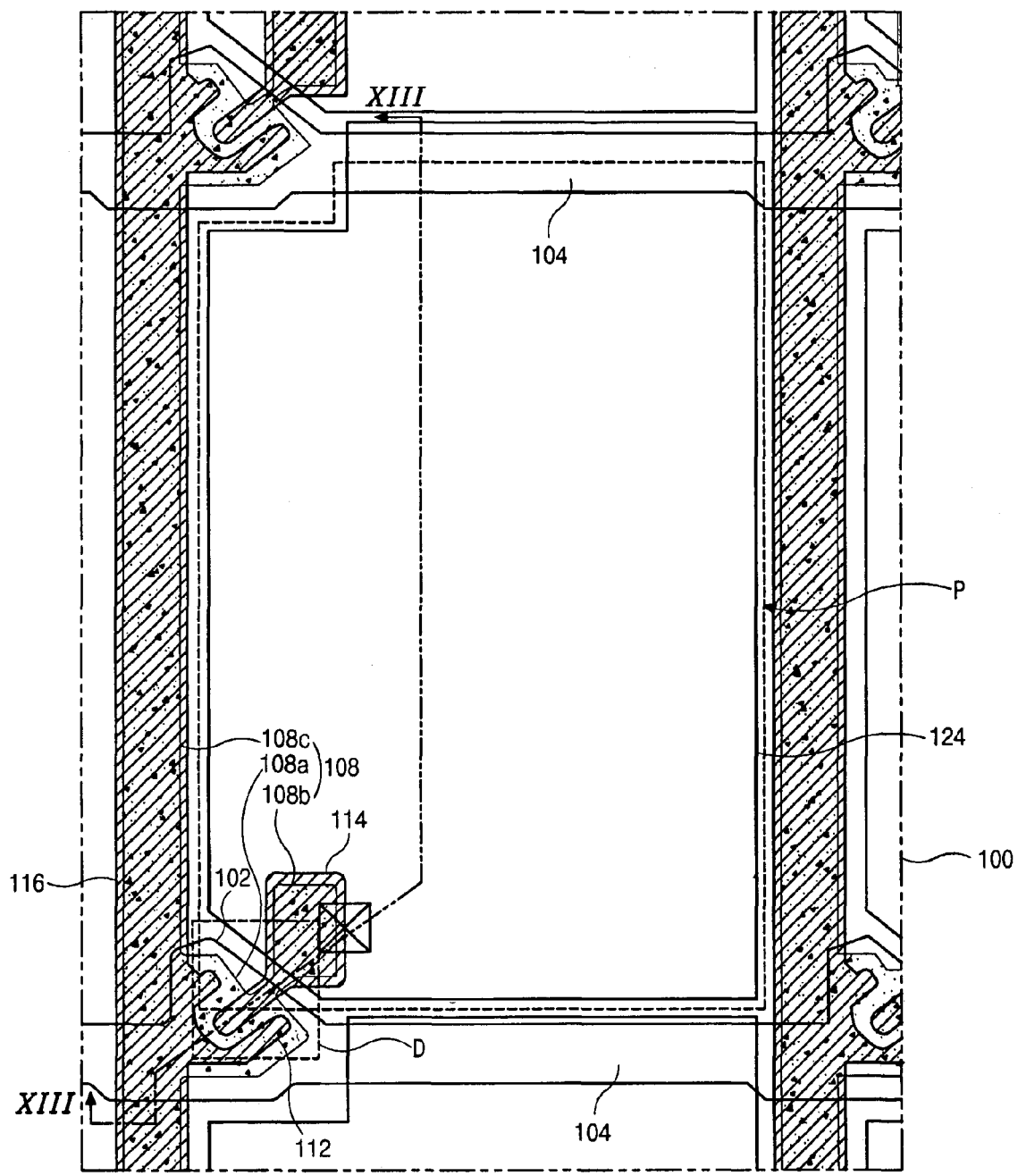
FIG. 6 is a plane view of an array substrate for a liquid crystal display device according to the present invention.
Figure 7:
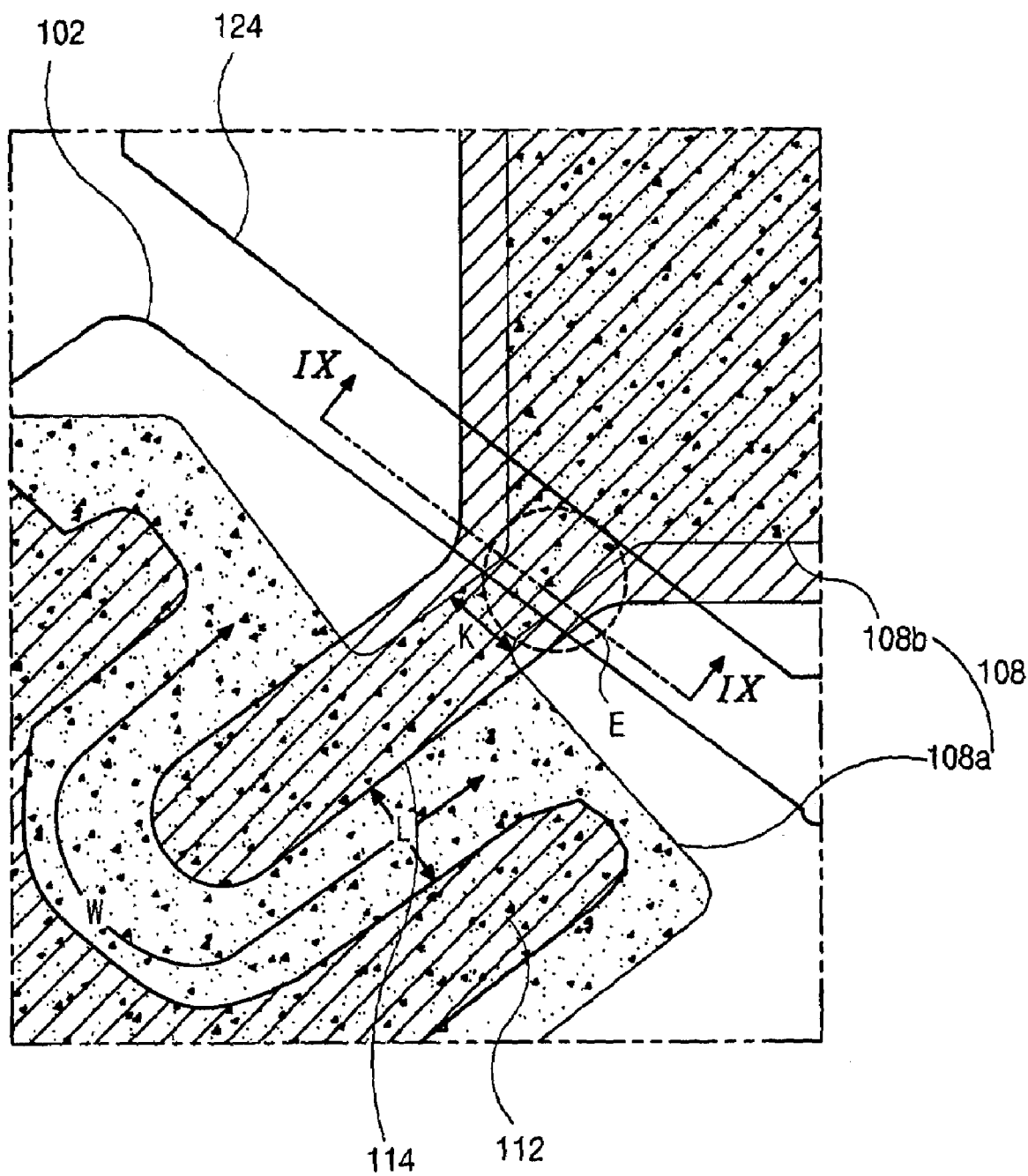
FIG. 7 is an enlarged plane view of region "D" of FIG. 6.

FIG. 6 is a plane view of an array substrate for a liquid crystal display device according to the present invention, and FIG. 7 is an enlarged plane view of region "D" of FIG. 6. In FIGS. 6 and 7, a plurality of gate lines 104 are formed in a first direction on a substrate 100, and a plurality of data lines 118 of a second direction cross each gate line 104 to define a pixel area P. A thin film transistor is formed at each intersection of the gate and data lines 104 and 116 to function as a switching element. The thin film transistor is composed of a gate electrode 102 connected to the gate line 104 and receiving scanning signals, a source electrode 112 connected to the data line 116 and receiving data signals, and a drain electrode 114 spaced apart from the source electrode 112. The thin film transistor further includes a semiconductor layer 108 between the gate electrode 102 and the source and drain electrodes 112 and 114.

A pixel electrode 124 is formed in the pixel area P and is connected to the drain electrode 114. The pixel electrode 124 overlaps the gate line 104 to form a storage capacitor.

Here, the source and drain electrodes 112 and 114 are spaced apart over the gate electrode 102. More specifically, the source electrode 112 is extended from the data line 116, and has a U-shape. The drain electrode 114 has a first part surrounded by the source electrode 112 and a second part overlapping the pixel electrode 124. The first part has a rod shape, and the second part is larger than the first part. Therefore, a channel between the source and drain electrodes 112 and 114 has a U-shape, and a current flowing the channel is increased because a length L of the channel gets shorter and a width W of the channel becomes wider.

Meanwhile, the semiconductor layer 108 consists of an active layer 108a over the gate electrode 102, a first extended portion 108b under the drain electrode 114, and a second extended portion 18c under the data line 116. The first and second extended portions 108b and 108c improve contact characteristics between the semiconductor layer 108 and the data line 116, and between the semiconductor layer 108 and the drain electrode 114, and may be removed.

Although not shown, an ohmic contact layer may be formed between the semiconductor layer 108 and the source and drain electrodes 112 and 114.

The first extended portion 108b of the semiconductor layer 108 adjacent to the active layer 108a becomes rapidly narrow toward the second part of the drain electrode 114 passing one side of the gate electrode 102. The rapidly narrowing portion of the first extended portion 108b is disposed over the gate electrode 102. Then, in region E outside the gate electrode 102, the first extended portion 108b of the semiconductor layer 108 is completely covered with the drain electrode 114, and an etchant does not permeate between the semiconductor layer 108 and the drain electrode 114. Therefore, a disconnection of the drain electrode 114 can be prevented. Here, at the boundary between the first extended portion 108b and the active layer 108a (i.e., region E), the drain electrode 114 has a width in the range of about 4.5 μm (micrometers) to about 5.6 μm (micrometers), and the first extended portion 108b of the semiconductor layer 108 has a width K in the range of about 2.8 μm (micrometers) to about 3.4 μm (micrometers).

Figure 8B:
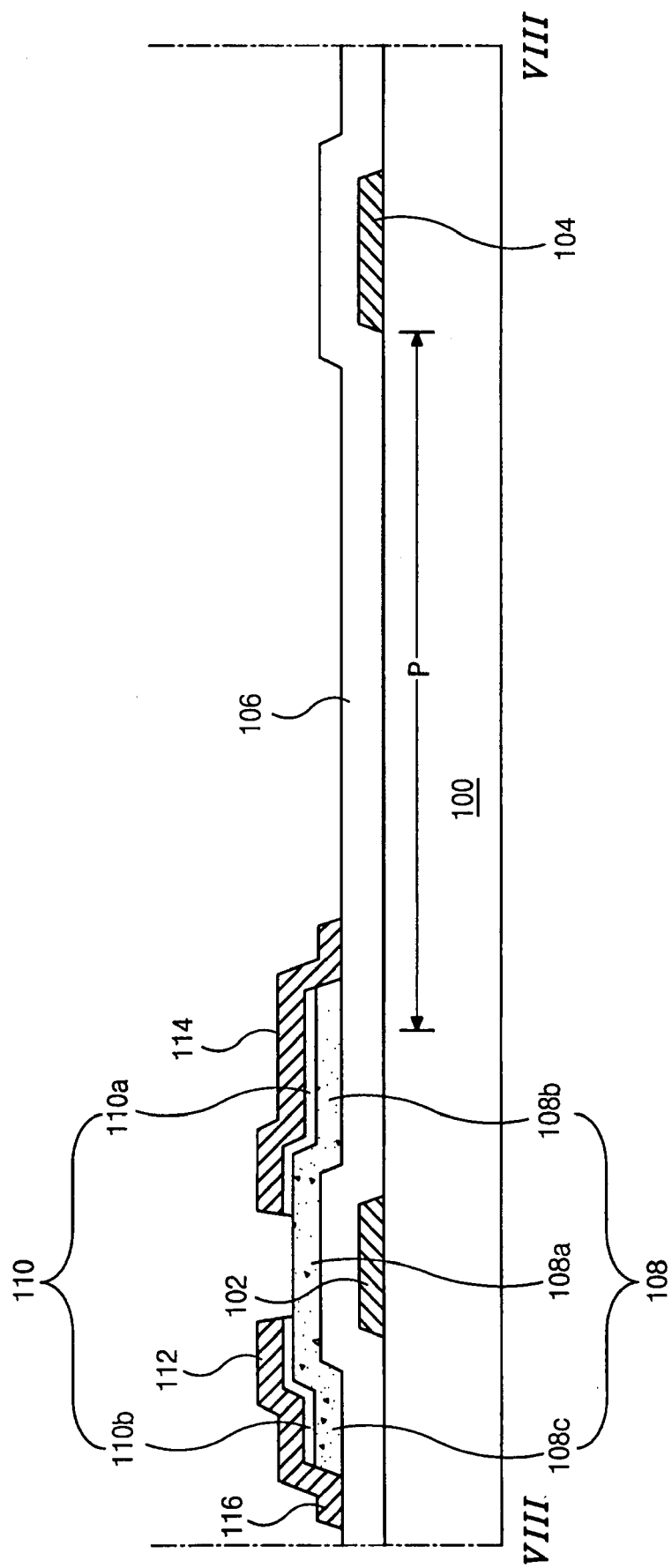

FIGS. 8A to 8C and FIGS. 9A to 9C show the sequential process steps for methods of fabricating an array substrate for a liquid crystal display device according to the present invention. FIGS. 8A to 8C are cross-sectional views taken along line VIII—VIII of FIG. 6, and FIGS. 9A to 9C are cross-sectional views taken along line IX—IX of FIG. 7.

Figure 9A:
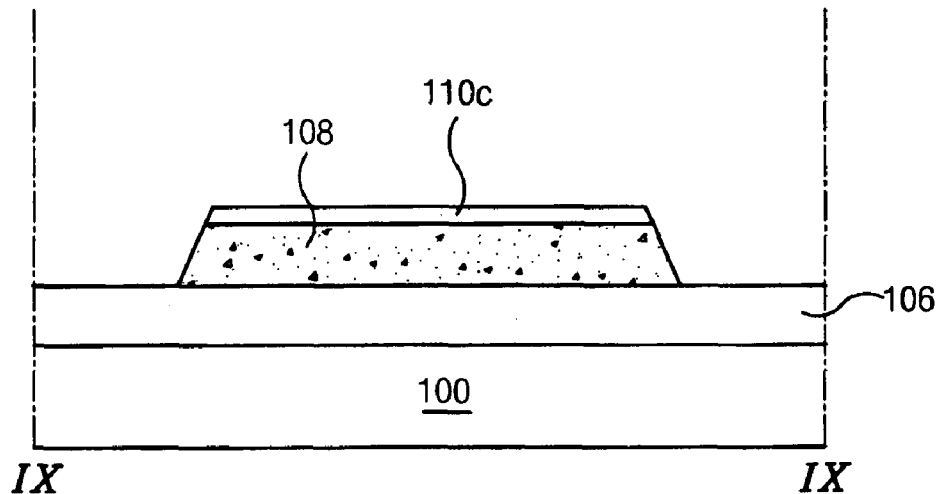
FIGS. 9A to 9C show the sequential process steps for a method of fabricating an array substrate for a liquid crystal display device according to the present invention and are cross-sectional views taken along line IX—IX of FIG. 7.

In FIGS. 8A and 9A, a gate line 104 and a gate electrode 102 are formed on a substrate 100 by depositing and patterning a first metal layer. The gate line 104 and the gate electrode 102 are made of a metallic material, such as aluminum (Al), an aluminum alloy of aluminum and neodymium (Nd), molybdenum (Mo), tungsten (W), and chromium (Cr). The gate line 104 and the gate electrode 102 may be formed of a double layer of aluminum or an aluminum alloy and molybdenum or chromium.

Aluminum having a relatively low electrical resistivity is widely used to form the gate line 104 and the gate electrode 102 to minimize RC delay. However, since aluminum can be easily corroded by acid during the fabrication process and causes hillock in a later process under a high temperature condition, the gate line 104 can be disconnected. Thus, the gate line 104 and the gate electrode 102 are formed of an alloy or a double layer including aluminum.

A gate insulating layer 106 is formed on the substrate 100 having the gate line 104 and the gate electrode 102 by depositing an inorganic insulating material, such as silicon nitride (SiNx) and silicon oxide ($SiO_2$), or by coating an organic insulating material, such as benzocyclobutene (BCB) and acrylic resin.

Then, a semiconductor layer 108 and a doped semiconductor layer 110c are subsequently formed on the gate insulating layer 106 over the gate electrode 102. The semiconductor layer 108 is made of amorphous silicon, and the doped semiconductor layer 110c is made of doped amorphous silicon.

Figure 9B:
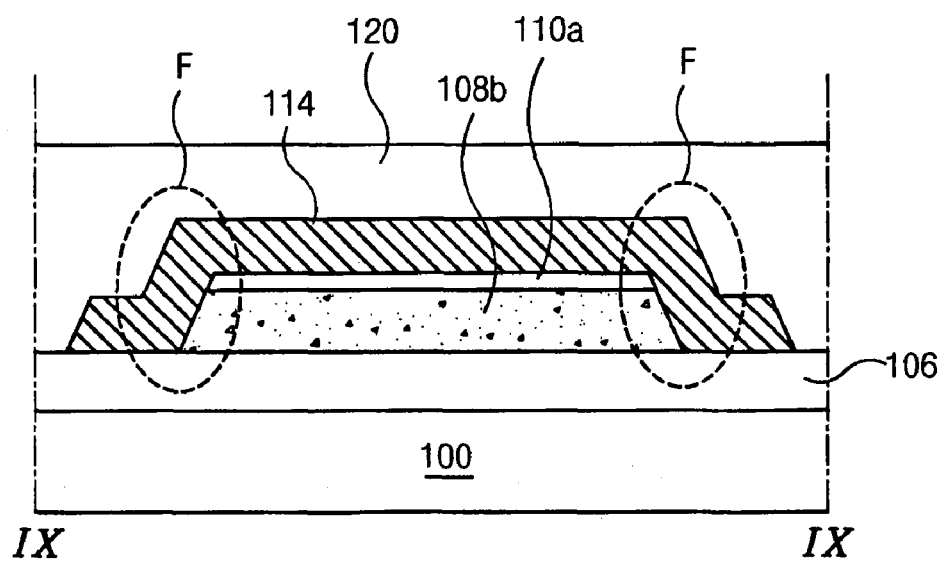

As shown in FIGS. 8B and 9B, a data line 116, a source electrode 112 and a drain electrode 114 are formed by depositing and patterning a second metal layer. The data line 116, the source electrode 112, and the drain electrode 114 may be made of the metal material mentioned above. Subsequently, a portion of the doped semiconductor layer 110c of FIG. 8A exposed between the source and drain electrodes 112 and 114 is removed, and thus an ohmic contact layer 110 is formed. As described above, the semiconductor layer 108 is composed of an active layer 108a over the gate electrode 102, a first extended portion 108b under the drain electrode 114, and a second extended portion 108c under data line 116. The ohmic contact layer 110 consists of a first portion 110a corresponding to the drain electrode 114 and a second portion 110b corresponding to the data line 116 and the source electrode 112.

Although it is not shown in the drawings, the source electrode 112 has a U-shape, and the drain electrode 114 has a first part of a rod shape and a second part larger than the first part. The source electrode 112 surrounds the first part of the drain electrode 114. The first extended portion 108b of the semiconductor layer 108 has a rapidly narrowing portion adjacent to the active layer 108a, which is disposed over the gate electrode 102, and the drain electrode 114 covers the first extended portion 108b of the semiconductor layer 108. Thus, the first extended portion 108b of the semiconductor layer 108 is not exposed in the region outside the gate electrode 102 (i.e., portion F of FIG. 9B), and a disconnection of the drain electrode 114 in region E of FIG. 7 can be prevented.

Figure 9C:
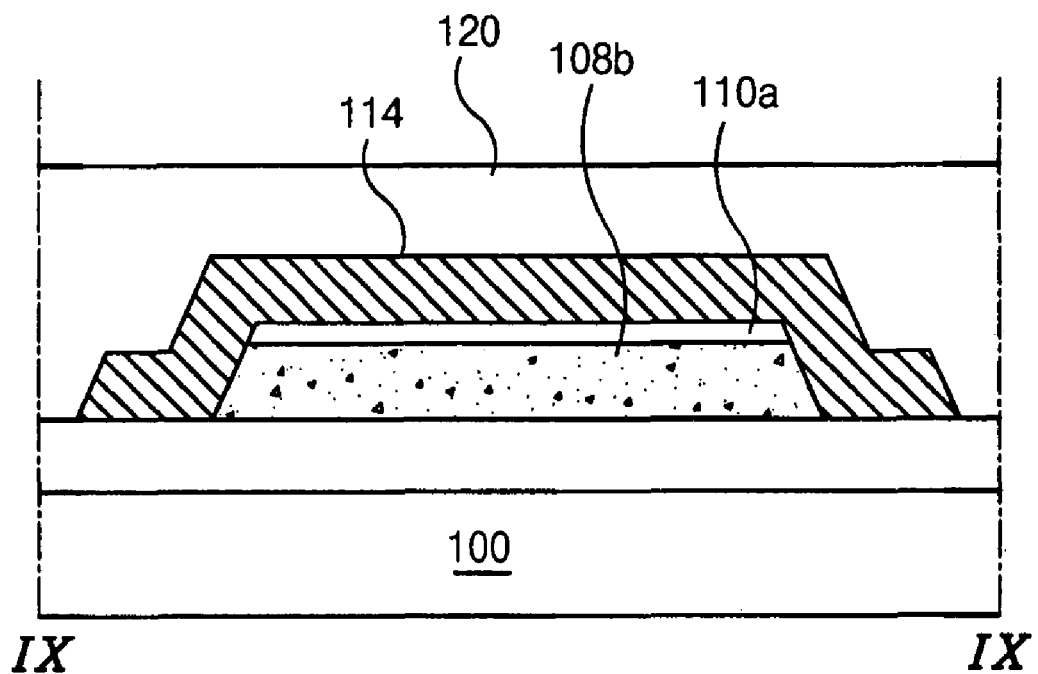

As shown in FIGS. 8C and 9C, a passivation layer 120 is formed on the substrate 100 including the source and drain electrodes 112 and 114 by coating a transparent organic material, such as benzocyclobutene (BCB) and acrylic resin, or by depositing an inorganic material, such as silicon nitride (SiNx) and silicon oxide ($SiO_2$). The passivation layer 120 is patterned, and a drain contact hole 122 exposing a portion of the drain electrode 114 is formed. Subsequently, a pixel electrode 124 is formed in a pixel area P on the passivation layer 120 by depositing and patterning a transparent conductive material, such as indium-tin-oxide (ITO) and indium-zinc-oxide (IZO). The pixel electrode 124 is connected to the drain electrode 114 through the drain contact hole 122.

In the array substrate for the LCD device according to the present invention, a disconnection of the drain electrode causing point defects can be prevented. Additionally, productivity of the LCD device can be improved due to low defects.

It will be apparent to those skilled in the art that various modifications and variations can be made in the array substrate for a liquid crystal display device and manufacturing method thereof of the present invention without departing from the spirit or scope of the inventions. Thus, it is intended that the present invention covers the modifications and variations of this invention provided they come within the scope of the appended claims and their equivalents.

What is claimed is:

1. A liquid crystal display device having an array substrate, comprising:
    a substrate;
    a gate line and a data line on the substrate, the gate line and the data line crossing each other and defining a pixel area;
    a thin film transistor electrically connected to the gate line and the data line, and including:
    a gate electrode connected to the gate line;
    a source electrode over the gate electrode and connected to the data line;
    a drain electrode spaced apart from the source electrode; and
    a semiconductor layer having an active layer over the gate electrode, a first extended portion, and a neck region connecting the active layer and the first extended portion, wherein the first extended portion and the neck region correspond to the drain electrode, and wherein both sides of the neck region are completely covered with the drain electrode parallel to an extended direction of the drain electrode toward the source electrode; and
    a pixel electrode in the pixel region and connected to the drain electrode.

2. The liquid crystal display device according to claim 1, wherein the source electrode has a U-shape and surrounds a part of the drain electrode.

3. The liquid crystal display device according to claim 2, wherein the part of the drain electrode has a rod shape.

4. The liquid crystal display device according to claim 1, further comprising a second extended portion corresponding to the data line in the semiconductor layer.

5. The liquid crystal display device according to claim 1, wherein the semiconductor layer is formed of amorphous silicon.

6. The liquid crystal display device according to claim 1, wherein the neck region has a width narrower than the active layer.

7. The liquid crystal display device according to claim 6, wherein the width of the neck region is in a range of about 2.8 µm (micrometers) to about 3.4 µm (micrometers).

8. The liquid crystal display device according to claim 7, wherein the drain electrode completely covering the neck region has a width in a range of about 4.5 µm (micrometers) to about 5.6 µm (micrometers).

9. The liquid crystal display device according to claim 1, further comprising a doped semiconductor layer between the semiconductor layer and the source electrode, and between the semiconductor layer and the drain electrode in the thin film transistor.

10. The liquid crystal display device according to claim 9, wherein the doped semiconductor layer is formed of doped amorphous silicon.

* * * * *